UNITED STATES PATENT OFFICE.

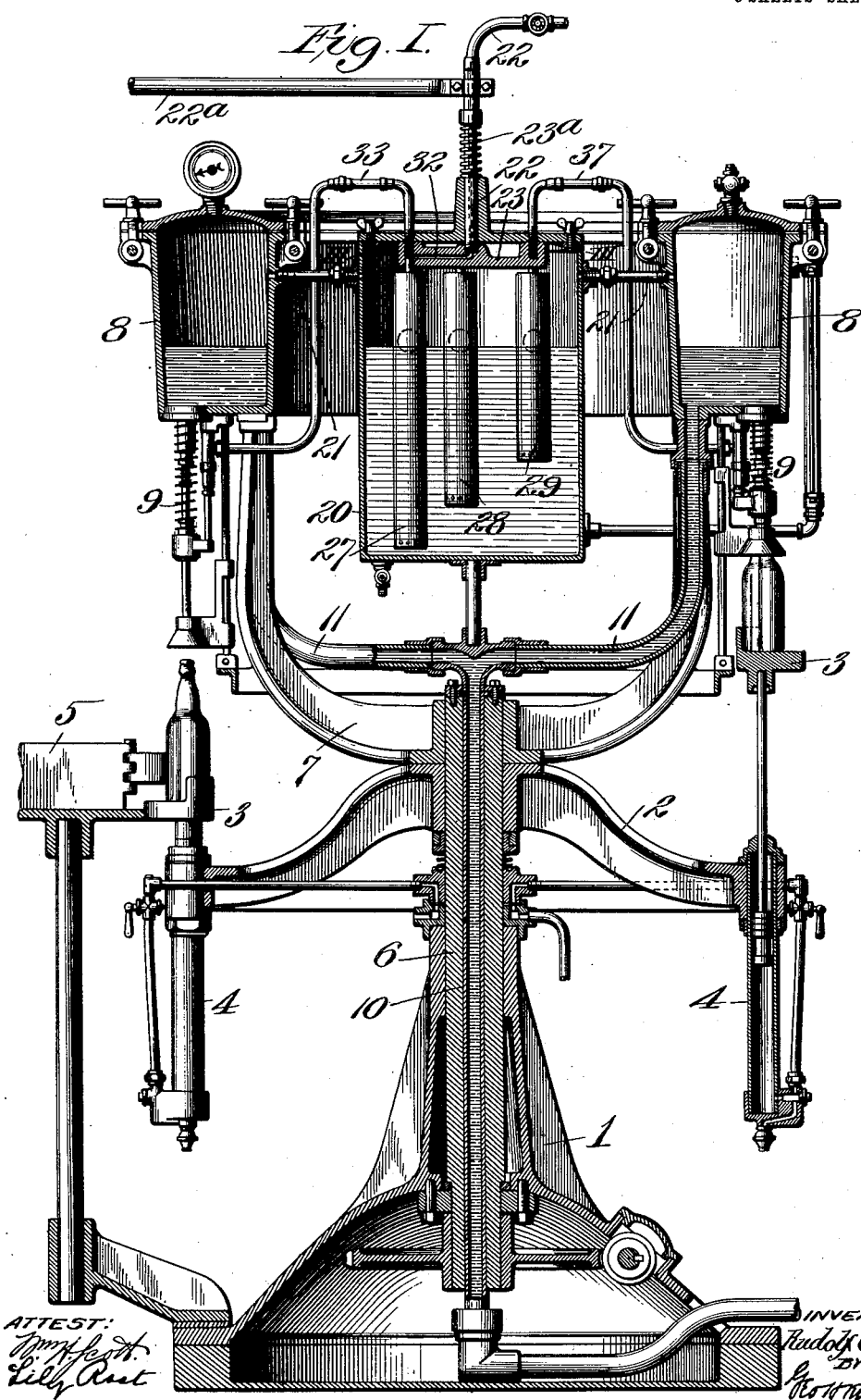

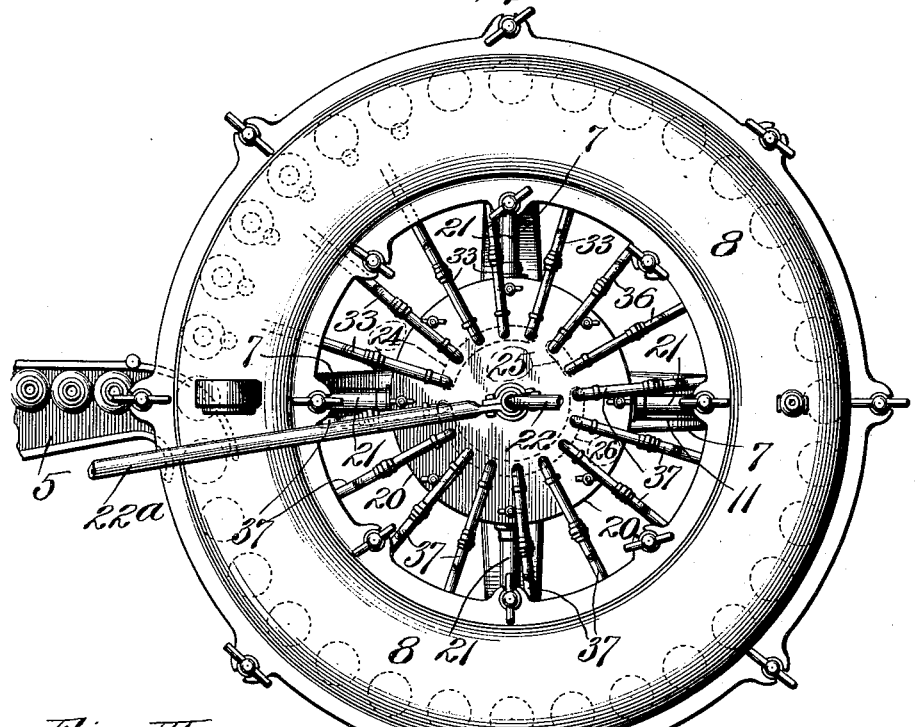

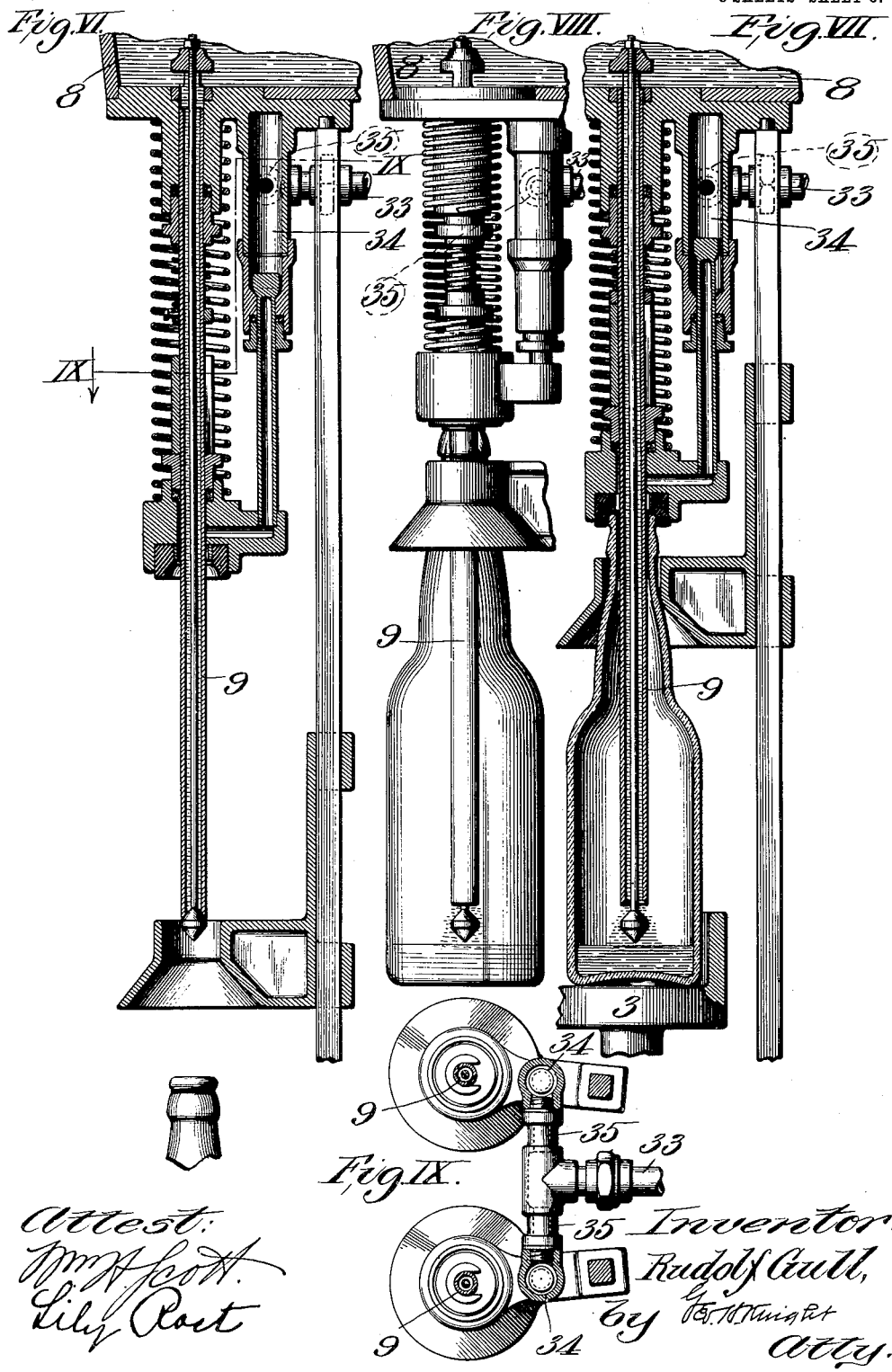

RUDOLF GULL, OF ST. LOUIS, MISSOURI.

PROCESS OF BOTTLING BEER.

938,577.  Specification of Letters Patent. Patented Nov. 2, 1909.

Application filed April 15, 1907. Serial No. 368,379.

*To all whom it may concern:*

Be it known that I, RUDOLF GULL, a citizen of Switzerland, residing in the city of St. Louis and State of Missouri, have invented certain new and useful Improvements in the Process of Bottling Beer, of which the following is a full, clear, and exact description, reference being had to the accompanying drawings, forming part of this specification, and which are presented for the purpose of elucidating my improved process.

My invention relates to an improved process of bottling beer, the object being to reduce to a minimum the loss, during the bottling process, of the carbonic acid gas contained in the beer.

In the operation of modern beer bottling machines the beer is introduced into a closed tank. From this tank it passes through a series of spouts into the bottles. The arrangement is such that the bottles are moved vertically with relation to the tank before the filling commences. The movement of the bottles first effects an air tight connection between them and the filling spouts and then opens the valves of the spouts, permitting the beer to flow from the tank into the bottles and permitting also the passage of air from the tank, above the beer, to the bottles, so as to have the same air pressure in both tank and bottles at or before the time the valves are opened, thus permitting the beer to flow by gravity from the tank into the bottles—the height of the beer column above the end of the filling spout, the width of the filling spout and the size of the air vent through which the air escapes from the bottles when the beer enters regulating the flow of the beer into the bottles.

Beer is a liquid saturated with carbonic acid gas at a pressure of from four to ten pounds, and at a temperature of from 0 to 2° Réaumur, and is very sensitive to an increase in temperature or a decrease in pressure. In either case the beer normally cannot keep the same amount of carbonic acid gas in solution and the slightest friction will result in a loss of carbonic acid gas. Even if the pressure and temperature are maintained during the bottling manipulation still the beer is very sensitive and a loss of carbonic acid gas during the bottling process, generally indicated by the foaming of the beer, is one of the foremost troubles of the bottler.

If water or oil was to be bottled with one of the machines such as I have briefly described either would flow quietly into the bottles while with beer the foaming action occurs. Having these difficulties in mind and knowing the importance of maintaining the quality of the beer by retaining as nearly as possible every particle of carbonic acid gas, I have sought to improve the process by maintaining a higher pressure in the bottles than in the beer supply tank, this difference in air pressure being slightly less than the combined air pressure in the tank and the weight of the column of beer from the tank to the lower end of the beer spouts. Therefore, in carrying out my invention the beer, as usual, enters a closed tank in which is kept a certain pressure (generally two to five pounds) but instead of establishing a direct air connection between the interior of the bottles and the air chamber in the tank above the body of beer, which would equalize the air pressure in the tank and bottles, I provide in the bottles an air pressure which is higher than the pressure on the beer but not quite as high as the combined pressure of the air on the beer and the weight of the beer at the lower end of the beer spout adjacent to the bottom of the bottle, and thus, when the beer spout is opened, the beer cannot run faster through the spout than the difference in pressure and the size of the beer spout permits of. By using this difference in pressure I obtained a slow flow of the beer through a wide tube and reduce the friction in the beer spout to such an extent as to practically remove all tendency for the beer to foam. As the beer in the bottle rises above the end of the filling spout, the weight of the liquid column in the spout above the level of the liquid in the bottle reaches the point where the height of the liquid in the spout above the level of the liquid in the bottle is equal in pressure to the surplus of air pressure in the bottle over the air pressure on the liquid in the tank, at which moment the flow of the liquid into the bottle will come to a stop. As the level of the beer in the tank is supposed to be kept at a practically uniform height, it depends, therefore, entirely on the regulation of the air pressure within the bottle, when the flow of the beer into the bottle will come to a stop. To accomplish the desired regulation of the gaseous pressure within the bottle, I use a body of liquid to balance the supply of air to the bottles and by keeping this body of liquid under the same gaseous pressure as the beer in the tank it is the height of this body of liquid pressing on the air supply to the bottles which determines the difference in pressure between the gaseous pressure in the bottles and the gaseous pressure on the beer in the tank. By varying the height of this liquid column, the gaseous pressure within the bottle can be changed while the beer enters the bottle, and a very uniform flow of the beer can thus be obtained.

For the purpose of elucidating my process I present drawings of a machine which may be utilized in carrying my process into effect, it being understood, however, that I do not wish to be limited in this patent to any particular form of machine.

In the accompanying drawings: Figure I is a vertical section, parts being shown in elevation. Fig. II is a top or plan view. Fig. III is an enlarged section taken on line III—III, Fig. I. Fig. IV is an enlarged top view of the cap or cover of the combined liquid and air tank. Fig. V is an enlarged detail view of the cover of the combined liquid and air tank, showing also parts of the air tubes or cylinders, their header and the air pipes. Figs. VI and VII are vertical sections of the bottle filling spouts and their associated parts. Fig. VIII is a side view of same. Fig. IX is an enlarged section taken on line IX—IX, Fig. VI.

Referring to the drawings: 1 represents a suitable stand upon which is mounted a revolving head or spider 2 that carries the bottle stands or supports 3 and the bottle lifts 4. The stand also supports the bottle receiving table 5. Within the stem of the stand is a hollow revolving shaft 6 with which the arms 2 have direct connection and to this shaft is also secured a frame or spider 7 that supports the closed annular beer tank 8 and likewise carries the beer spouts 9. The shaft also carries the beer supply pipe or tube 10 with its branches 11. As illustrated in Fig. I of the drawings, there is a free passage for the beer through the pipe 10 and its branches 11 so that the tank 8 may be kept constantly supplied with beer during the bottling operation of the machine, and thus the tank 8 at all times during the bottling operation may contain the same, or approximately the same, amount of beer, and the beer level, therefore, may be constant, or substantially so.

The above parts with their mode of operation are to be found in a well known form of beer bottling machine now on the market so that they require no detail description. I will now proceed to describe the part of the machine shown in the annexed drawings which relate more particularly to the novel features of my improved process.

20 represents a combined liquid and air tank. This liquid may be either water, oil, mercury or other substance and preferably fills the tank about two-thirds or three-fourths of its height, above which is the air space. The air space portion of the tank communicates with the air space portion of the beer tank through one or more short pipes 21: I have shown four of these pipes but more or less might be used, the object being to keep as constant and uniform an equilibrium of pressures between the air space of the tank 20 and the air space of the tank 8 as possible, and at the same time not use too many pipes or pipes that are too large considering the space available for the purpose.

22 represents an air pipe that extends through the top of the tank 20 and communicates with a head 23 located close up against the inner face of the top of the tank, against which it is held by a spring 23ª, as shown clearly in Fig. I. The tank 20 revolves with the tank 8 while the head 23 remains stationary as does also the pipe 22, the latter being held by a brace 22ª. The top of the tank has an elongated hub, as shown in Fig. I, and the lower end of the pipe 22 acts as a journal for this hub. The head 23 is provided, see Fig. III, with air ducts or passages 24, 25 and 26. Depending from the head and communicating with the duct 24 is a long tube or cylinder 27 that extends nearly to the bottom of the tank 20.

28 is a somewhat shorter tube or cylinder depending from the head 23 and which communicates with the duct or passage 25, and 29 represents a still shorter tube or cylinder depending from the head and communicating with the duct or passage 26. The lower ends of all three of these tubes are provided with numerous perforations for the free passage of the liquid from the tank to the interior of the tubes. The tubes 27, 28, and 29 being filled with air to the point where they are perforated beneath the surface of the liquid in the tank 20 in which the said tubes are partially immersed, form, each with its respective air duct 24, 25, and 26, separate air reservoirs in which the air pressure is balanced by the body of liquid in the tank 20.

As seen by dotted lines in Fig. III and by full lines to the left of Fig. V, the partitions between the ducts 24 and 25 and between 25 and 26 are provided with holes 30 for the passage of air from one duct to another and the hole between the duct 25 and the duct 26 is made smaller than the other hole so as to offer more resistance to the passage of the air. The wall or partition 31 between the adjacent ends of the ducts 24 and 26 is not perforated.

32 represents a passage in the head 23 leading from the pipe 22 to the duct 24.

33 represents pipes forming a communication between the duct 24 and the air chambers 34 of the first ten (starting from the loading point) of the filling spouts of the machine. Instead of having a pipe for each filling spout I have shown but five and each pipe connects with two of the filling spouts by means of a branch 35 as shown in Fig. IX. Of course, there could be a separate pipe 33 for each one of the spouts but complication and material is saved by the use of these branches. The air chamber of the filling spouts is an old feature in itself. Heretofore, however, this chamber has had communication, through means of a riser, with the air space in the upper part of the beer tank 8, (see U. S. Patent No. 768,963, August 30, 1904), whereas, with my arrangement, the air passes to the bottles only by way of the head 23 of the air and liquid tank so as to be under the direct effect of the weight of the liquid in the tank.

By connecting the ducts 24, 25 and 26 together by the passages 30 there is required but one communication 32 between the pipe 22 and one of the ducts (in this case duct 24) and by making the passage between the ducts 25 and 26 smaller than the passage between the ducts 24 and 25, the same effect is produced (which is desirable in the operation of the machine) as there would be if a smaller pipe were used between the pipe 22 and the duct 26 than between the pipe 22 and the duct 25. The same result could be accomplished by using three separate communications 32 between the pipe 22 and the three ducts 24, 25 and 26, but it is simpler and easier to accomplish the result by having but a single passage-way 32 and use the described passages 30 between the ducts.

36 represents pipes forming communications between the duct 25 and the next four of the filling spouts to those supplied from the pipes 33. There are two of these pipes but by virtue of the use of the branches referred to they supply air to the air chambers of four of the spouts.

37 represents pipes forming communications between the duct 26 and the air chambers of the remaining filling spouts of the machine.

While I have shown and prefer to use a certain arrangement of the air pipes and a certain number for forming communication between the different ducts and the different air chambers of the filling spouts, yet this might be varied—as for instance, the duct 24 might supply a lesser or a greater number of filling spouts than I have shown and described and this may be true also of the other ducts. The object, however, should be to have the air pressure in the bottles subjected to the different liquid weights of the different tubes of the liquid tank at as near the proper time as possible to secure regularity in action in the filling of the bottles. Inasmuch as the head 23, with the air supply pipe 22 and the cylinders 27, 28 and 29 are kept stationary, while the other parts rotate, each of the pipes 33, 36 and 37 comes successively into open communication with the air ducts 24, 25 and 26, to which the cylinders 27, 28 and 29 are respectively connected, as stated.

The dotted lines within the tubes 27, 28 and 29, at the liquid line, are intended to represent floating ball valves designed to close the tops of the tubes 27, 28 and 29 (should the pressure of air in the tanks 8 and 20 ever exceed the pressure in the pipe 22) before the liquid in the tubes (due to this back pressure) reaches the ducts 24, 25 and 26, so as to avoid all possibility of any of the liquid ever reaching the bottles. It is, of course, apparent that the same result would be attained if, instead of having the tubes 27, 28 and 29 of different lengths with the perforations at the bottom, they were all of the same length with the perforations made at different elevations—that is, with the perforations of the tube 27 at the bottom, the perforations of the tube 28 higher up and the perforations of the tube 29 still higher up. In this case the liquid in the tubes 28 and 29 beneath the perforations would be simply so much dead matter. It is also apparent that the machine could be operated without any compressed air in the tanks 8 and 20. In this case the tanks will be left open at the top and the liquid weight would act only to govern the flow of beer against its gravity or weight.

The operation is as follows: Before the machine is started up sufficient air is introduced through the pipe 22 to fill the cylinders or tubes 27, 28 and 29 with the desired air pressure for the operation of the machine. The air completely fills the tubes and, escaping from the lower ends thereof, passes up through the liquid and enters the air spaces in the upper parts of the tanks 8 and 20. When the desired pressure (about four pounds) is attained in the upper portions of the tanks (which can be ascertained by a suitable gage placed on one of the tanks, as shown in Fig. I) the air valve in the pipe 22 is closed down sufficiently to maintain just the desired constant pressure. It should be turned down to a point where but a very small quantity of air will escape through the perforations in the lower ends of the tubes in the liquid tank and owing to the fact that the ducts 24, 25 and 26 communicate with each other, through the passages 30, there will be slight escape of this air through all of the tubes at all times while the machine is in operation. While there is a uniform air pressure in the upper parts of the tanks 8 and 20 yet there will be more pressure in the supply pipe 22 and in the tubes 27, 28 and 29 and also in the pipes 33, 36 and 37, than there is in the upper parts of the tanks, this being due to the weight of the liquid in the tank 20 which acts upon the air in the tubes, and this difference in pressure, due to the liquid weight, varies according to the length of the tubes, the liquid weight of the tube 27 being greater than that of the tube 28 and the latter being greater than that of the tube 29. Back pressure of gas from the bottles passes through the supply pipes into the ducts 24, 25 and 26 and thence down through the tubes into the liquid from whence it passes up through the liquid in the tank 20, and any excess of air pressure that is formed in the upper part of the tank 8 above the beer will pass out through a suitable vent cock, such as is shown on the right hand side of Fig. I of the drawings. The machine being set in operation, the air pressure in the tubes is transmitted, through the described connection, and independent of the flow of the beer to the beer bottles as soon as the bottles are brought to filling position in the regular operation of the machine, and the beer starts to flow against this air pressure which is only slightly less than the pressure of the beer at the end of the filling spouts, which guarantees a quiet start of the beer into the bottles. The flow of the beer would come to a stop, however, after the beer in the bottles rises above the end of the beer spouts were it not for the movement of the machine which brings the bottles into communication with the duct 25 in which the air is balanced with a somewhat less liquid weight than is the air in the duct 24. The pressure in the bottles is hereby decreased on account of the bottles communicating with the tube 28 instead of the tube 27, which former tube is subject to a lesser weight of liquid. Moving further the bottles are subjected to the air pressure in the duct 26, which, in turn, is slightly less than the air pressure in the duct 25, due to the fact that the air in the tube 29 is subjected to a somewhat less liquid weight than the air in the tube 28 and thus the equalization of air pressure in the bottles at predetermined intervals is maintained independent of the flow of the beer until the bottles are filled and the flow of beer to the bottles will cease, if the machine is in perfect order, when the bottles become filled no matter if the bottles have not been withdrawn from the filling spouts because the pressure in the bottles will have become balanced with the beer pressure at the mouth of the bottle.

I claim:

1. The improvement in the method of bottling beer consisting in maintaining in the bottles while they are being filled with beer, and independent of the flow of the beer, a higher gaseous pressure than on the surface of the supply or column of beer with which the bottles are filled, and changing such higher pressure at predetermined intervals during the time the beer is entering the bottles, substantially as set forth.

2. The improvement in the method of bottling beer consisting in maintaining successively in the bottles while they are being filled with beer two or more distinctly different gaseous pressures each one of which is successively maintained in a substantially constant proportion to the gaseous pressure on the column of beer, substantially as set forth.

3. The improvement in the method of bottling beer, consisting in maintaining in the bottles while they are being filled a higher gaseous pressure than that on the column of beer from which the bottles are filled, and in maintaining such higher gaseous pressure within the bottles at such a proportion to the gaseous pressure on the column of beer that the surplus of pressure in the bottle over the gaseous pressure on the column of beer balances the weight of the column of beer above the level of beer in the bottle as soon as the beer in the bottle reaches a predetermined level.

RUDOLF GULL.

In presence of—
LILY ROST,
BLANCHE HOGAN.